United States Patent
Subramanian et al.

(10) Patent No.: US 11,335,373 B1
(45) Date of Patent: May 17, 2022

(54) PLASMONIC TRANSDUCER HEAD FOR WRITING DATA TO AND READING DATA FROM AN OPTICAL RECORDING MEDIUM ULTILIZING A FLUORESCENT DYE

(71) Applicant: Seagate Technology LLC, Fremont, CA (US)

(72) Inventors: Krishnan Subramanian, Shakopee, MN (US); Aditya Jain, Minneapolis, MN (US); Riyan Alex Mendonsa, Minneapolis, MN (US); Anil J. Reddy, Minneapolis, MN (US); Edward Charles Gage, Lakeville, MN (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 0 days.

(21) Appl. No.: 17/181,804

(22) Filed: Feb. 22, 2021

(51) Int. Cl.
| | | |
|---|---|---|
| G11B 11/105 | (2006.01) | |
| G11B 7/1387 | (2012.01) | |
| G11B 7/24067 | (2013.01) | |
| G11B 7/127 | (2012.01) | |
| G11B 7/13 | (2012.01) | |
| G11B 5/00 | (2006.01) | |

(52) U.S. Cl.
CPC ............ *G11B 7/1387* (2013.01); *G11B 7/127* (2013.01); *G11B 7/13* (2013.01); *G11B 7/24067* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 5,289,407 A | 2/1994 | Strickler et al. | |
| 6,071,671 A | 6/2000 | Glushko et al. | |
| 7,330,404 B2* | 2/2008 | Peng | G11B 7/1387 360/59 |
| 7,439,009 B2 | 10/2008 | Wang et al. | |
| 7,936,802 B2 | 5/2011 | Singer et al. | |
| 9,275,671 B2 | 3/2016 | Singer et al. | |
| 2002/0118627 A1* | 8/2002 | Inagaki | G11B 7/00455 369/108 |
| 2009/0207703 A1* | 8/2009 | Matsumoto | G11B 9/14 369/13.33 |

(Continued)

OTHER PUBLICATIONS

Choo, Hyuck et al., "Nanofocusing in a metal-insulator-metal gap plasmon waveguide with a three-dimensional linear taper," Nature Photonics, 6, 838-844, 2012.

*Primary Examiner* — Tan X Dinh
(74) *Attorney, Agent, or Firm* — Holzer Patel Drennan

(57) ABSTRACT

3D optical data storage refers to forms of optical data storage in which information can be recorded and/or read with 3D resolution. 3D optical media are generally limited in areal density by the diffraction limit of laser light used to read and/or write data to and/or from the optical media. It is thus advantageous to find ways to store data on 3D optical media with a spot size below the diffraction limit of an associated laser reader to further increase areal density of the optical media. A hybrid approach that utilizes plasmon technology to access a surface layer of the 3D optical media with an extremely small spot size and photon technology to access interior layers of the 3D optical media with a larger spot size may substantially increase overall data density of the 3D optical media.

19 Claims, 6 Drawing Sheets

(56) References Cited

U.S. PATENT DOCUMENTS

| | | | | |
|---|---|---|---|---|
| 2010/0091618 | A1* | 4/2010 | Schabes | B82Y 10/00 369/13.02 |
| 2011/0096639 | A1* | 4/2011 | Matsumoto | G11B 5/314 369/13.33 |
| 2016/0077167 | A1* | 3/2016 | Heidmann | G01Q 70/14 324/304 |
| 2016/0377675 | A1* | 12/2016 | Ukraintsev | G01R 31/311 324/754.23 |

* cited by examiner

PLASMONIC TRANSDUCER HEAD FOR WRITING DATA TO AND READING DATA FROM AN OPTICAL RECORDING MEDIUM ULTILIZING A FLUORESCENT DYE

BACKGROUND

Optical storage refers generally to the storage of data on an optically readable medium. Data is recorded by making marks on the medium in a pattern that can be read back with the aid of light, typically a beam of laser light focused on a spinning optical disc. An optical disc drive is a device utilized in a computing system that can read CD-ROMs or other optical disc media, such as DVDs and Blu-ray discs. Optical storage relies on optically discernable markings on the media, which differs from other data storage technologies, such as magnetism (e.g., hard disc drives and floppy disk drives) and semiconductors (e.g., flash memory). Optical storage systems can range from a single optical disc drive reading a single CD-ROM to multiple optical drives reading multiple discs, such as that found in an optical jukebox.

Areal density is a measure of the quantity of information bits that can be stored on a given length of track, area of surface, or in a given volume of a computer storage medium. In terms of optical storage on an optical disc, areal density is generally measured in bits per length of track. Generally, higher areal density is more desirable, for it allows more data to be stored in the same physical space. Areal density therefore has a direct relationship to storage capacity of a given medium.

Ever increasing demand for data storage drives with increased data capacity encourages technologies that improve areal density, such as three-dimensional (3D) optical data storage. 3D optical data storage refers to forms of optical data storage in which information can be recorded and/or read with 3D resolution (as opposed to the two-dimensional (2D) resolution afforded, for example, by CD-ROMs).

Optical storage, including 3D optical media, is generally limited in areal density by the diffraction limit of laser light used to read and/or write data to and/or from an optical medium. It is thus advantageous to find ways to store data on optical media with a spot size below the diffraction limit of an associated laser reader to further increase areal density of the optical media, including 3D optical media.

SUMMARY

Implementations described and claimed herein address the foregoing problems by providing a plasmonic transducer head for an optical storage medium. The plasmonic transducer head comprises a plasmon antenna including a light source to generate a light pulse, a plasmon antenna optics set to receive and focus the light pulse, and a near field transducer (NFT) to receive the focused light pulse and convert it to a plasmon pulse directed on a target area to be read from the optical storage medium. The plasmon pulse excites the target area to emit a fluorescent signal. The plasmonic transducer head further comprises a fluorescence detector configured to detect fluorescence of the target area caused by the plasmon pulse. The fluorescence detector includes a light detector tuned to an expected frequency of the fluorescent signal and a detector optics set to receive the fluorescent signal from the excited target area and direct the fluorescent signal to the light detector.

Implementations described and claimed herein address the foregoing problems by further providing an optical storage drive comprising a multi-layered optical storage medium, a plasmon antenna, a laser emitter, and a fluorescence detector. The plasmon antenna includes a light source to generate a light pulse, an emitter optics set to receive and focus the light pulse, and a near field transducer (NFT) to receive the focused light pulse and convert it to a plasmon pulse directed on a surface target area to be read from one or more surface layers of the multi-layered optical storage medium. The plasmon pulse excites the surface target area to emit a fluorescent signal. The laser emitter includes a laser source to generate a laser pulse and a laser emitter optics set to receive and focus the laser pulse on an interior target area to be read from an interior layer of the multi-layered optical storage medium, the laser pulse to excite the interior target area to emit a fluorescent signal. The fluorescence detector is configured to detect fluorescence of an excited target area caused by one of the plasmon pulse and the laser pulse. The fluorescence detector includes a light detector tuned to an expected frequency of the fluorescent signal and a detector optics set to receive the fluorescent signal from the excited target area and direct the fluorescent signal to the light detector.

Other implementations are also described and recited herein.

DETAILED DESCRIPTION

Two-dimensional (2D) data storage media, such as CD and DVD media, store data as a series of reflective marks on a singular internal surface of an optical disc. In order to increase storage capacity, optical discs may utilize two or more data layers in a three-dimensional (3D) format. Complicating 3D optical data storage is that an addressing laser interacts with every layer that it passes through on the way to and from the addressed layer. These interactions can cause noise that conventionally limits 3D optical data storage to approximately ten layers. Some 3D optical data storage methods overcome this issue by using photonic addressing methods where only the specifically addressed volumetric pixel (voxel) interacts substantially with the addressing light, such as utilizing fluorescence, which is described in further detail below. However, 3D optical data storage methods using photonic addressing are limited in spot size by the wavelength of the addressing light. For example, a lower limit on spot size for photonically addressed media is approximately 100 nm-300 nm linear (or approximately 8,000-71,000 $nm^2$ in spot area).

Figure 1:
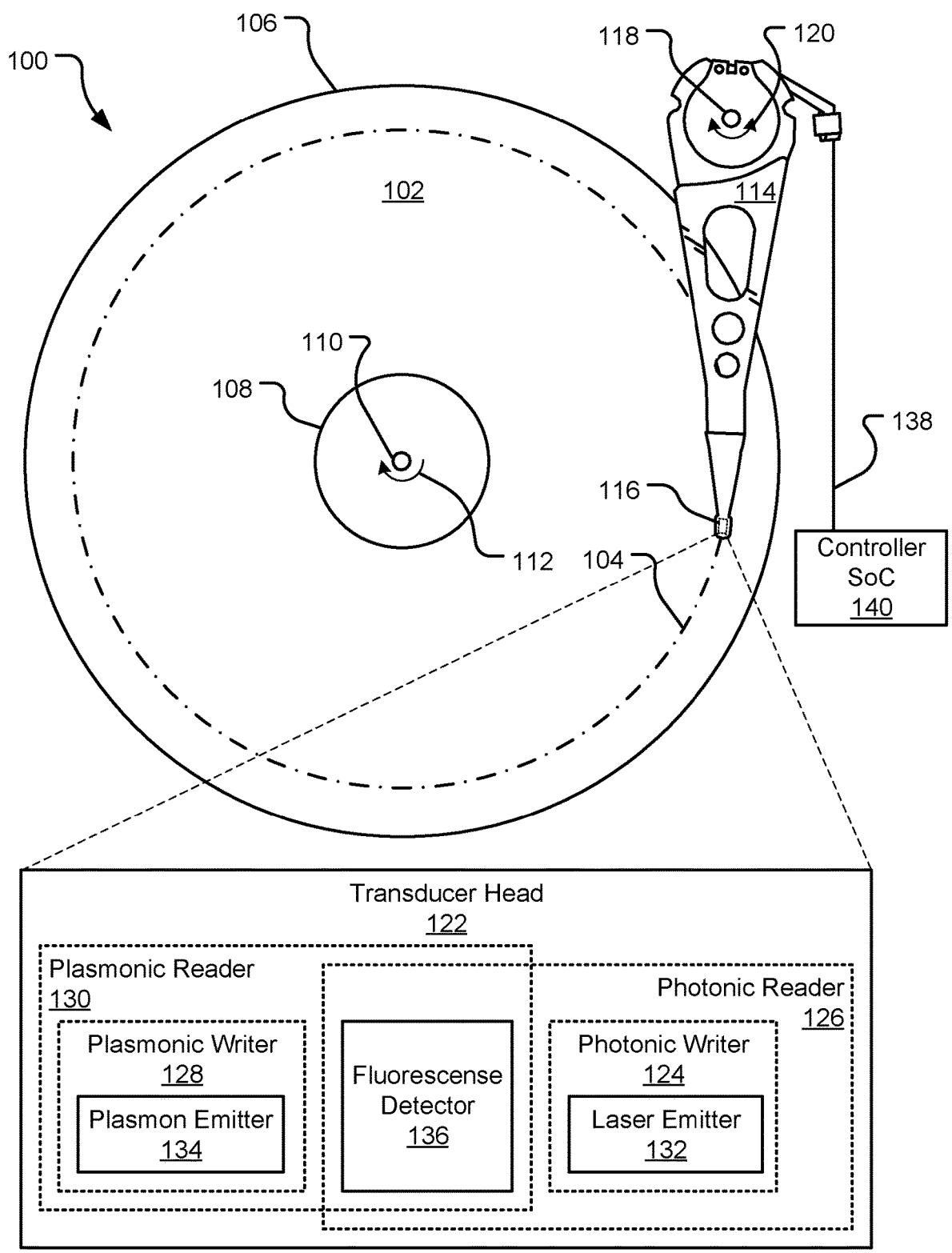
FIG. 1 illustrates an example optical disc drive including a transducer head with a photonic reader/writer and a plasmonic reader/writer.

FIG. 1 illustrates an example optical disc drive 100 including a transducer head 122 with a photonic reader 126/writer 124 and a plasmonic reader 130/writer 128. Storage platter 102 includes an outer diameter 106 and an inner diameter 108 between which are a number of substantially circular data tracks running in a spiral arrangement making up an entirety of the readable and/or writable surface area of the storage platter 102. Specific locations on the storage platter 102 may be defined by any available addressing scheme (e.g., cylinder-head-sector (CHS) addressing and logical block addressing (LBA) schemes). In 3D formats, the storage platter 102 also contains many layers of information, each at a different depth in the storage platter 102 and each including a number of substantially circular data tracks running in the spiral arrangement. The storage platter 102 rotates at high speed about platter spindle 110 (as illustrated by arrow 112) as information is written to and/or read from data tracks (e.g., track 104) on the storage platter 102.

Information may be written to and read from the storage platter 102 via the actuator arm 114 and its respective slider 116. More specifically, the actuator arm 114 pivots about actuator spindle 118 using a first servo motor (or voice-coil motor (VCM), not shown) during a seek operation to locate the data track 104 on the storage platter 102, as illustrated by arrow 120. The actuator arm 114 extends toward the storage platter 102 and the slider 116 is located at an end of the actuator arm 114 distal from the actuator spindle 118. The slider 116 aerodynamically creates an air-bearing between the slider 116 and the spindle 118 as the slider 116 flies in close proximity above the storage platter 102 while reading data from and/or writing data to the depicted top surface of the storage platter 102.

The optical disc drive 100 may include a number of additional components that allow the optical disc drive 100 to function properly that are not shown for clarity purposes (e.g., a head-gimbal assembly that defines a desired head-media spacing). Further, the storage platter 102 includes an array of embedded volumetric pixels (voxels) that are used to store data and the slider 116 includes an array of micro-electronic components (e.g., the transducer head 122, thermal actuators, head-media spacing micro-actuators, etc.). The transducer head 122 includes a photonic writer 124, a photonic reader 126, a plasmonic writer 128, and a plasmonic reader 130, each of which is made up of one or more of a laser emitter 132, a plasmon antenna 134, and a fluorescence detector 136.

The various layers of the storage platter 102 are treated with a fluorescent dye that illuminates when exposed to photonic or plasmonic energy with a magnitude below a bleaching threshold. If photonic or plasmonic energy is applied at a magnitude above the bleaching threshold, the fluorescent dye is bleached rather than illuminated. In this manner, data may be stored on data tracks and within layers of the storage platter 102 in a binary fashion by selectively bleaching target areas of the storage platter 102. Then, the data is read back from the data tracks and within layers of the storage platter 102 by detecting target areas that fluoresce (not bleached) versus those that do not fluoresce (bleached) when exposed to photonic or plasmonic energy with a magnitude below the bleaching threshold. Data may also be read back by distinguishing the frequency of the fluorescence from a frequency of reflected photonic or plasmonic energy. This may help to reduce noise, particularly when reading layers deep within the storage platter 102.

The photonic writer 124 utilizes the laser emitter 132 to write data to the storage platter 102, particularly to interior layers of the storage platter 102 below the surface layer. In some cases, the photonic writer 124 may also be used to write data to the surface layer of the storage platter 102 as well. Specifically, the laser emitter 132 is focused at a particular depth in the storage platter 102 that corresponds to a target data layer. When the laser emitter 132 is energized with an incident photonic energy (e.g., a combination of pulse duration and intensity) above the bleaching threshold, it causes a photochemical change in the storage platter 102 on the data track 104 within a specific data layer of the storage platter 102 where the laser emitter 132 is focused (or addressed). As the storage platter 102 spins beneath the slider 116, the data track 104 is written at the desired depth. The depth of the laser emitter 132 focus and/or the radial positioning the slider 116 may be changed to write subsequent tracks of data and data layers of the storage platter 102. The number of layers potentially written by the photonic writer 124 is influenced by a number of factors (e.g., laser power, absorbance within the data layers, fluorescence power, detector characteristics, etc.). In some implementations, the distance between data layers may be 5 to 100 micrometers, potentially allowing 10's of layers of data to be stored on the storage platter 102.

The photonic reader 126 utilizes the laser emitter 132 and the fluorescence detector 136 to read data from the storage platter 102, particularly interior layers of the storage platter 102 below the surface layer. In some cases, the photonic reader 126 may also be used to read data from the surface layer of the storage platter 102 as well. In order to read data from the storage platter 102, a similar procedure as described above with reference to writing data using the photonic writer 124 is used, except instead of causing a photochemical change in the storage platter 102, the laser emitter 132 causes fluorescence in the targeted area of the storage platter 102. This may be achieved by applying a lower power (below the bleaching threshold) to the laser emitter 132 or operating the laser emitter 132 at a different wavelength than that used to write data.

The fluorescence detector 136 is oriented at the same area of the storage platter 102 as the photonic writer 124 and detects the emitted fluorescence from the targeted area of the storage platter 102. The presence, intensity, and/or wavelength of detected fluorescence from the storage platter 102 is different depending on whether the storage platter 102 has been written in the target area using the photonic writer 124, and so by measuring the emitted light the data is read and compared against an expected fluorescence frequency and magnitude.

The plasmonic writer 128 utilizes the plasmon antenna 134 (also referred to as a plasmonic light focusing element) to write data to the storage platter 102, particularly to the surface layer of the storage platter 102. As the output from the laser emitter 132 shines through free space and is thus not bounded, it has a diffraction limit equal to its wavelength divided by two (e.g., if the laser emitter 132 output has a wavelength of 400 nm, it is impossible to focus below a 200 nm spot size, and likely impractical to focus below a 300 nm spot size. In contrast, the plasmon antenna 134 generates plasmons, which focus light to below its wavelength in the near field. Accordingly, the plasmon antenna 134 can focus to a much smaller spot size (e.g., 30 nm, or even smaller), which yields a much greater potential data density afforded by the plasmonic writer 128. However, the plasmon antenna 134 is lossy over distances and not focusable on interior data layers of the storage platter 102. Thus, the plasmonic writer 128 is only effective on the surface layer or grouping of surface layers (e.g., the top three layers) of the storage platter 102.

Specifically, the plasmonic writer 128 outputs a spot size (or target area) of plasmons directed at a particular data track (here, data track 104) on the surface layer of the storage platter 102. When the plasmon antenna 134 is energized, it internally shines light on plasmonic metal and the plasmonic metal converts the light from photons to plasmons transmitted over an electromagnetic (EM) wave. The EM waves (of plasmons) focused through a plasmonic gap waveguide causes a photo-chemical change in the storage platter 102 (if energized above the bleaching threshold) on the data track 104 with the spot size of the EM waves. As the storage platter 102 spins beneath the slider 116, the data track 104 is written. Radial positioning of the slider 116 may be changed to write data to the surface layer on a variety of data tracks of the storage platter 102.

The plasmonic reader 130 utilizes the plasmon antenna 134 and the fluorescence detector 136 to read data from the storage platter 102, particularly the surface layer of the storage platter 102. In order to read data from the storage platter 102, a similar procedure as described above with reference to writing data using the plasmonic writer 128 is used, except instead of causing a photochemical change in the storage platter 102, the plasmon antenna 134 causes fluorescence in the targeted spot size of the storage platter 102. This may be achieved by applying a lower power (below the bleaching threshold) to the plasmon antenna 134 or operating the plasmon antenna 134 at a different wavelength than that used to write data.

The fluorescence detector 136 is oriented at the same area of the storage platter 102 as the plasmonic writer 128 and detects the emitted fluorescence from the targeted area of the storage platter 102. The intensity and/or wavelength of detected fluorescence from the storage platter 102 is different depending on whether the storage platter 102 has been written in the target area using the plasmonic writer 128, and so by measuring the emitted light the data is read.

Other implementations of the photonic writer 124 and/or the plasmonic writer 128 may utilize partial bleaching of the fluorescent dye to achieve multiple data storage levels rather than binary storage. Still further, multiple dyes may be applied to the storage platter 102 at different levels, or even the same level, that fluoresce at distinct frequencies. Thus, data may be layered (or overlapped) by distinguishing the frequencies between the applied fluorescent dyes when reading data using the photonic reader 126 and/or the plasmonic reader 130.

The size of individual chromophore molecules or photoactive color centers within the storage platter 102 is much smaller than the size of the laser focus (which is determined by the diffraction limit of the laser emitter 132 output). The light therefore addresses a large number (e.g., $10^9$) of molecules at any one time, so the storage platter 102 acts as a homogeneous mass rather than a matrix structured by the positions of chromophores. As noted above, the diffraction limit of the laser emitter 132 output defines a lower limit on the size of an area of the storage platter 102 written by the laser emitter 132. Plasmonic technology may be used to write data to smaller areas on the storage platter 102, at the cost of range. For example, the plasmonic technology described herein is limited to the surface layer of the storage platter 102 but achieves a far greater data density than the photonic technology described above. Accordingly, in one implementation of the presently disclosed technology, the plasmonic writer 128 and reader 130 are operated to read and write data on the surface layer of the storage platter 102 at a very high data density, while the photonic writer 124 and reader 126 are operated to read and write data from interior layers of the storage platter 102, albeit at a lower data density.

A flex cable 138 provides electrical connection paths from a controller SoC 140 to the various microelectronic components attached to the actuator arm 114 and the slider 116. The flex cable 138 transmits data signals from the read/write head 122, while allowing pivotal movement of the actuator arm 114 during operation.

In other implementations, there may be two or more storage platters stacked and rotating together about the platter spindle 110. In such implementations, an actuator arm and its respective slider may be assigned to each of the stacked storage platters. For example, the actuator arm 114 and its respective slider 116 may read data from and/or write data to the storage platter 102, while another actuator arm and its respective slider may read data from and/or write data to another storage platter (not shown) stacked above or below the storage platter 102. In still further implementations, the optical disc drive 100 includes a stacked array of any number of storage platters, each of which has an arm and a respective slider as described herein assigned to one or both surfaces (i.e., top and bottom surfaces) of the storage platters. In other implementations, the storage platter 102 may be selectively interchangeable with other storage platters within the optical disc drive 100 to read/write data from/to the other storage platters.

Appearances of the storage platter 102, the actuator arm 114, the read/write head 122, and other features of the optical disc drive 100 are for illustration purposes only and the features are not drawn to scale. Further, while the storage platter 102 is described herein as a spinning disc, in other implementations, the storage platter 102 may be an optical card or optical tape.

The storage platter 102 may be manufactured using any available technology. In implementations that utilize numerous writable layers separated by buffer layers, the storage platter 102 may be extruded as a unitary structure with the desired number of layers. The storage platter 102 may also be formed from a set of layers, divided and then co-extruded. More specifically, the writeable layers, separated by the buffer layers, can be first formed via co-extrusion. In a subsequent manufacturing step, the resulting recording layers are placed (e.g., affixed or adhered) onto the storage platter 102. In lieu of or in addition to extrusion (and/or co-extrusion), the storage platter 102 may be manufactured using a fold-and-stretch process, where a singular writable/buffer layer stack (or a set of several stacks) is stretched and folded at least once to double the number of writable layers each time the storage platter 102 is stretched and folded. In other implementations, the writable layers and buffer layers may be applied on top of one another, over time building up a desired number of layers making up the storage platter 102. Further still, during the manufacturing process, embedded servo markers may be applied to the surface layer of the storage platter 102 for indexing purposes. Bits and grooves traditionally used for indexing optical media may not be permissible as the head-media spacing for the plasmonic writer 128/plasmonic reader 130 is much smaller than in conventional optical storage drives.

The various microelectronic components attached to the slider 116, including but not limited to the laser emitter 132, the plasmon antenna 134, and the fluorescence detector 136, may be referred to in total as the transducer head 122 (also referred to herein as a read/write head). Additional details regarding the transducer head 122 and various components and features thereof may be found elsewhere herein.

Figure 2:
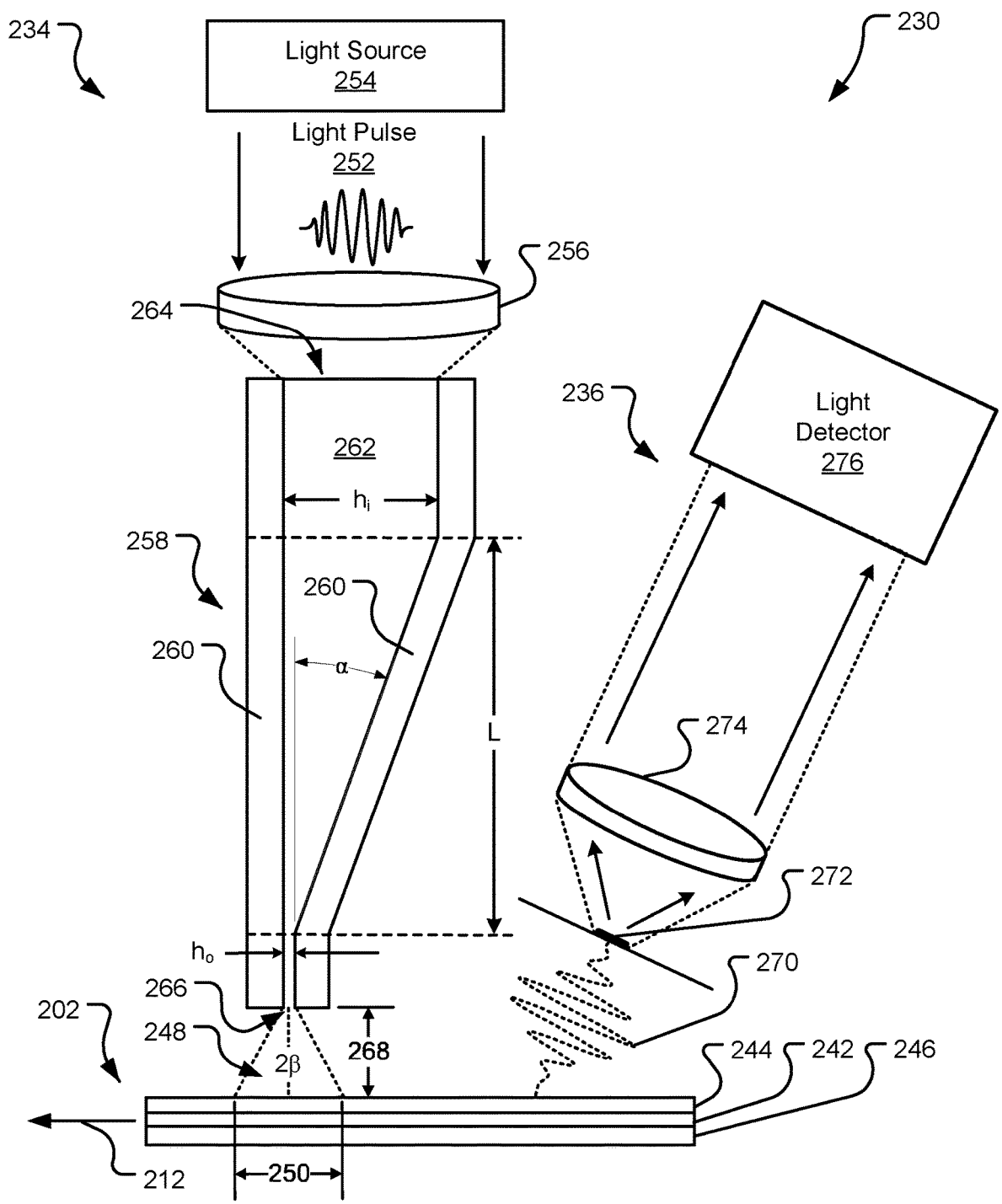
FIG. 2 illustrates an example plasmonic reader/writer for an optical storage medium.

FIG. 2 illustrates an example plasmonic reader/writer 230 for an optical storage medium 202. The optical storage medium 202 (also referred to herein as a storage platter) includes a number of substantially circular data tracks running in a spiral arrangement making up an entirety of the readable and/or writable surface area of the optical storage medium 202 (see e.g., storage platter 102 of FIG. 1). The optical storage medium 202 is illustrated in FIG. 2 in a 2D format with a singular recording layer 242 bounded by buffer layers 244, 246. In 3D formats, the optical storage medium 202 contains many recording layers (see e.g., optical storage medium 402 of FIG. 4). The optical storage medium 202 rotates at high speed about a platter spindle (not shown, see e.g., platter spindle 110 of FIG. 1) as information is written to and/or read from data tracks on the optical storage medium 202.

Information may be written to and read from the optical storage medium 202 via an actuator arm (not shown, see e.g., actuator arm 114 of FIG. 1) and its respective slider (not shown, see e.g., slider 116 of FIG. 1). The actuator arm extends toward the optical storage medium 202 and the slider is located at an end of the actuator arm. The slider flies in close proximity above the optical storage medium 202 as the optical storage medium 202 rotates below, as illustrated by arrow 212. The slider includes the plasmonic reader/writer 230, which in turn includes a plasmon antenna 234 and a fluorescence detector 236. Further, the plasmon antenna 234 alone may additionally function as a plasmonic writer. Thus, the plasmonic reader/writer 230 may be used for reading data from and/or writing data to the recording layer 242 of the optical storage medium 202 as discussed in further detail below.

When functioning as a plasmonic writer, the plasmon antenna 234 directs a plasmon pulse 248 at a write target area 250 on a particular data track of the recording layer 242. Specifically, the plasmon antenna 234 receives a light pulse 252 from a light source 254 (e.g., a laser oscillator). In various implementation, the light pulse 252 oscillates at 2-10 fs. The light pulse 252 is directed to an emitter optics set 256 (e.g., an objective lens) that focuses the light pulse 252 on a near-field transducer (NFT) input 264 for NFT 258. In other implementations, greater or fewer individual optics components (e.g., mirrors, lenses, filters, etc.) are used to receive the light pulse 252 and route it to the NFT 258.

The NFT 258 is a self-focusing waveguide including a perimeter plasmonic metal 260 (e.g., gold (au), silver (ag) or aluminum (al)) that converts incoming photons from the light pulse 252 into plasmons making up the plasmon pulse 248. In one example implementation, the NFT 258 is bounded on at least two sides (as shown) by external layers of the plasmonic metal 260 surrounding an internal semi-conducting layer 262 (e.g., silicon dioxide ($SiO_2$)). The plasmonic metal 260 serves to convert the photons into plasmons, while the internal semiconducting layer 262 serves to guide and focus the photons/plasmons through the NFT 258 to an NFT output 266.

Figure 3:
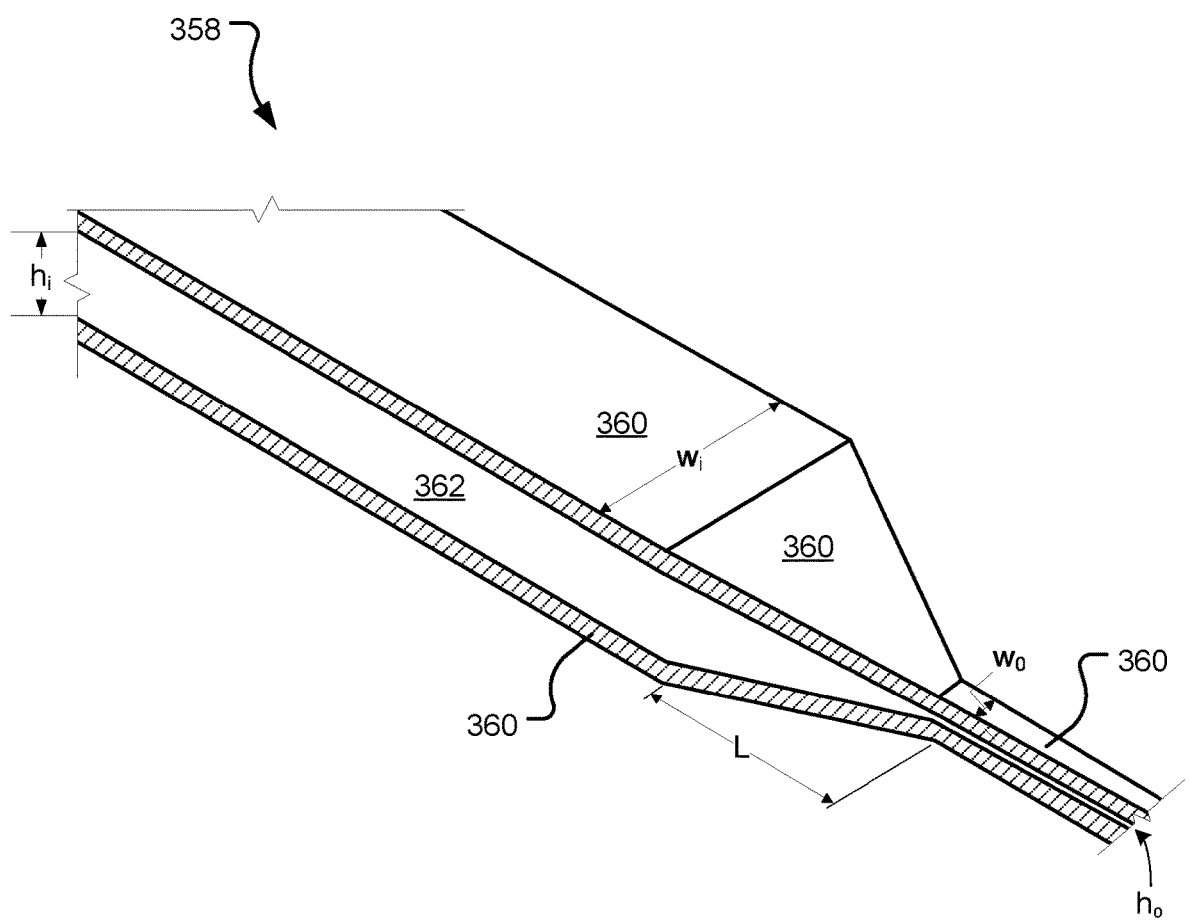
FIG. 3 illustrates an example near-field transducer (NFT) for a plasmon antenna.

The NFT 258 may include a 3D linear taper, as shown in FIGS. 2 and 3. In an example implementation, the NFT input 262 has a height dimension ($h_i$) of approximately 200 nm and the NFT output 266 has a height dimension ($h_o$) of approximately 5 nm. Further, the NFT input 262 has a width dimension (not shown, see e.g., $w_i$ of FIG. 3) of approximately 500 nm and the NFT output 266 has a width dimension (not shown, see e.g., $w_o$ of FIG. 3) of approximately 5 nm. Still further, the 3D linear taper of the NFT 258 may be approximately 1,000 nm long (L). The dimensions of the 3D linear taper of the NFT 258 define a focusing angle (α) of approximately 26 degrees.

The dimensions of the 3D linear taper of the NFT 258 also define a divergence angle (2β) of the plasmon pulse 248. Specifically, as an example, a divergence angle of the plasmon pulse 248 is equal to $2*β=λ/h=405$ nm/5 nm=81 degrees. Further, a gap 268 is provided between the NFT output 266 and the optical storage medium 202. A combination of the divergence angle of the plasmon pulse 248 and the gap 268 defines the target area 250. Specifically, as an example, the divergence angle of the plasmon pulse 248 (2*β) is equal to approximately 81 degrees and the gap 268 is equal to approximately 1.95 nm, which yields a target area 250 dimension of 3.28 nm. While the foregoing calculation of the target area 250 dimension is linear, the NFT 258 may output generally conical-shaped plasmon pulse 248 that yields a round target area 250 with a diameter of 3.28 nm (target area $250=8.45$ $nm^2$), for example. In other implementations, the dimensions of the NFT 258 are optimized to yield a target area 250 of less than 30 $nm^2$. Dimensions that are described herein as approximate are +/−10% of the dimension provided, unless otherwise specified.

The plasmon pulse 248 causes a photochemical change in the recording layer 242 in the target area 250. More specifically, the recording layer 242 is treated with a fluorescent dye. The fluorescent dye generally fluoresces when exposed to the plasmon pulse 248, however, if the power applied by the plasmon pulse 248 is above a bleaching threshold, the fluorescent dye is bleached rather than caused to fluoresce. The targeted bleaching on the fluorescent dye is used to write data. A fluorescent signal 270 (discussed in further detail below) read-back from the recording layer 242 varies in frequency and/or magnitude in bleached areas of the recording layer 242 as compared to nonbleached areas of the recording layer 242. Due to the permanence of bleaching the fluorescent dye, use of the plasmon antenna 234 as a plasmonic writer is a write once, ready many (WORM) technology. As the storage platter spins beneath the slider, a series of sequentially written plasmon pulse 248 target areas forms a written data track on the recording layer 242. The radial positioning the slider may be changed to write data to the recording layer 242 on a variety of data tracks of the optical storage medium 202.

As noted above, the plasmonic reader/writer 230 includes both the plasmon antenna 234 and the fluorescence detector 236 to read data from the optical storage medium 202, particularly the recording layer 242. In order to read data from the recording layer 242, a similar procedure as described above with reference to writing data using the plasmon antenna 234 is used, except instead of causing a photochemical change in the recording layer 242, the plasmon antenna 234 outputs a power sufficient to cause fluorescence in the target area 250, but insufficient to cause a photochemical change in the recording layer 242.

The fluorescence detector 236 is positioned in close proximity to the plasmon antenna 234 to maximize capture of the fluorescent signal 270 and is also oriented at the target area 250. Further, the fluorescence detector 436 may be placed on either side of the plasmon antenna 234. Note that while the fluorescence detector 236 is illustrated as pointing behind the target area 250, as the optical storage medium 202 is in motion (as illustrated by the arrow 212), the fluorescence detector 236 is timed to detect fluorescence (or lack thereof) from the target area 250 caused by the plasmon antenna 234 as the target area 250 passes behind the plasmon antenna 234. The intensity and/or wavelength of detected fluorescence (or lack thereof) is different depending on whether the recording layer 242 has been written in the target area 250 (e.g., bleached) or not.

Specifically, the data track to be read-back from the recording layer 242 emits a emits a variable fluorescent signal 270 as the optical storage medium 202 spins and the plasmon antenna 234 is focused on successive target areas. The fluorescence detector 236 receives this variable fluorescent signal 270 into a collection lens 272 and a collimation lens 274 (collectively, a detector optics set) and routes a resulting collimated beam of light with varying intensity (or detected magnitude) and/or frequency back to a light detector 276 (e.g., a silicon detector), while converts the collimated beam of light into a data read-back signal. In various implementations, the light detector 276 is tuned to an expected frequency of the fluorescent signal 270. Data may also be read back by distinguishing the frequency of the fluorescence from a frequency of reflected photonic or plasmonic energy. This may help to reduce noise. In other implementations, greater or fewer individual optics components (e.g., mirrors, lenses, filters, etc.) are used to receive the fluorescent signal 270 and route it to the light detector 276.

Appearances of the optical storage medium 202, the plasmon antenna 234, the fluorescence detector 236, and other features of the plasmonic reader/writer 230 are for illustration purposes only and the features are not drawn to scale.

FIG. 3 illustrates an example near-field transducer (NFT) 358 for a plasmon antenna (not shown). In various implementations, the NFT 358 may be of a gap-style or a peg-style. The plasmon antenna may function as a plasmonic writer and/or a component of a plasmonic reader, as described elsewhere herein. The NFT 358 is a self-focusing waveguide including a perimeter plasmonic metal 360 (e.g., silver (ag) or aluminum (al)) that converts incoming photons from a light pulse (not shown, see e.g., light pulse 252 of FIG. 2) into plasmons making up a plasmon pulse (not shown, see e.g., plasmon pulse 248 of FIG. 2). More specifically, the NFT 258 is bounded on at least two sides (e.g., top and bottom, as shown in FIG. 3) by external layers of the plasmonic metal 360 surrounding an internal semiconducting layer 362 (e.g., silicon dioxide ($SiO_2$). The plasmonic metal 360 serves to convert the photons into plasmons, while the internal semiconducting layer 362 serves to guide and focus the photons/plasmons through the NFT 358 to an NFT output (not shown, see e.g., NFT output 266 of FIG. 2). In other implementations, the NFT 358 may include the plasmonic metal at its entrance to convert incoming photons into plasmons making up the plasmon pulse, and then semiconducting material along its length to direct the plasmon pulse with a low loss. Further, dielectric waveguides can also be used to route the light on-chip and make the design more compact.

Figure 4:
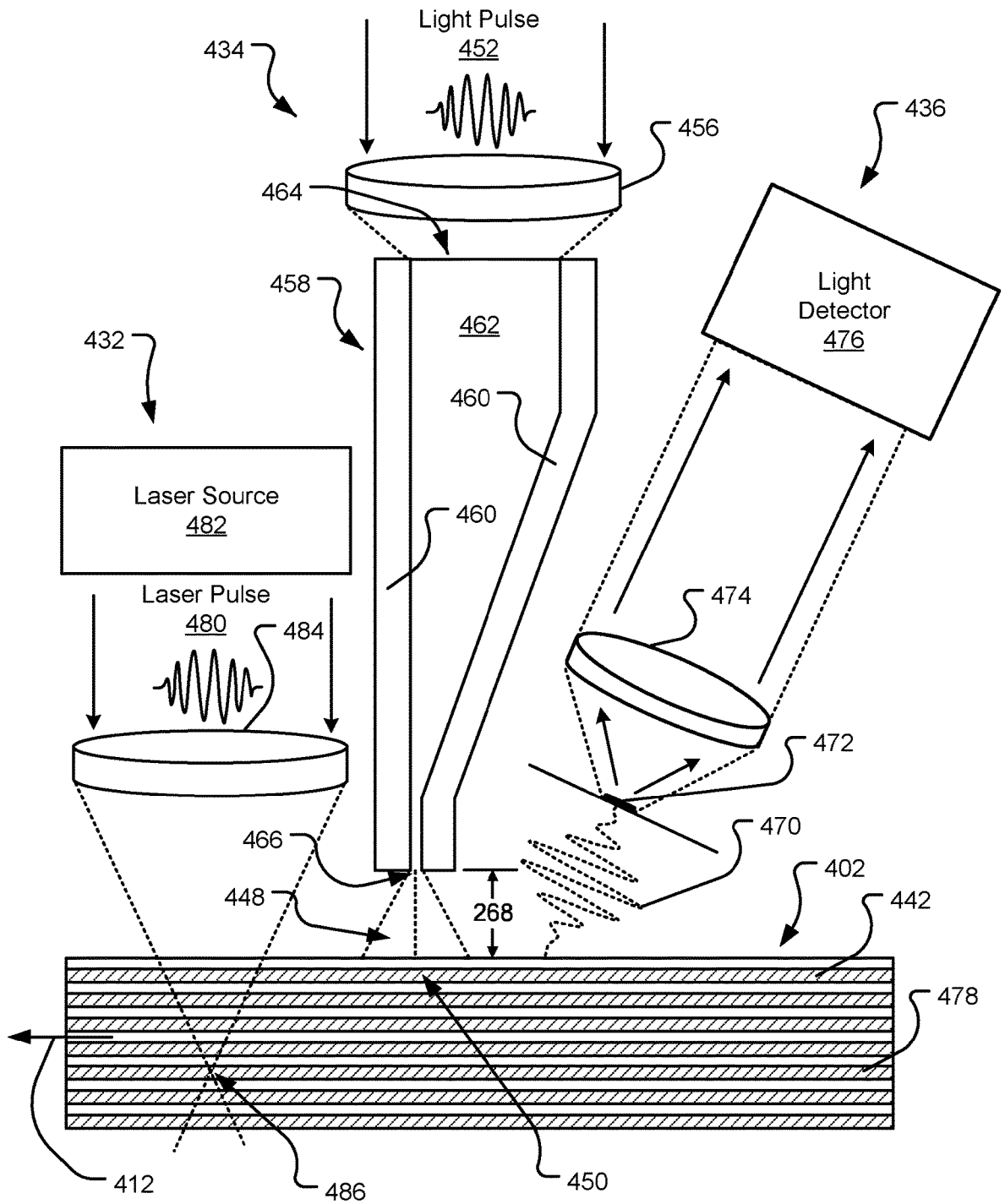
FIG. 4 illustrates an example combined photonic reader/writer and a plasmonic reader/writer for a three-dimensional (3D) optical storage medium.

The NFT 358 may include a 3D linear taper, as shown in FIGS. 2-4. In an example implementation, the NFT input 362 has a height dimension ($h_i$) of approximately 200 nm and the NFT output 366 has a height dimension ($h_o$) of approximately 5 nm. Further, the NFT input 362 has a width dimension ($w_i$) of approximately 500 nm and the NFT output 366 has a width dimension ($w_o$) of approximately 5 nm. Still further, the 3D linear taper of the NFT 358 may be approximately 1,000 nm long (L). The dimensions of the 3D linear taper of the NFT 358 define a divergence angle (2β) of the plasmon pulse. Specifically, as an example, a divergence angle of the plasmon pulse is equal to $2*β=\lambda/h=405$ nm/5 nm=81 degrees. Dimensions that are described herein as approximate are +/−10% of the dimension provided, unless otherwise specified.

FIG. 4 illustrates an example combined photonic reader/writer and plasmonic reader/writer for a 3D optical storage medium 402. The 3D optical storage medium 402 (also referred to herein as a storage platter) is illustrated in side-view and includes a number of substantially circular data tracks running in a spiral arrangement making up an entirety of the readable and/or writable surface area of the optical storage medium 402 (see e.g., storage platter 102 of FIG. 1). The optical storage medium 402 is illustrated in FIG. 4 in a 3D format with seven separate recording layers (illustrated by hatching) bounded by buffer layers (illustrated without hatching). A top-most recording layer within the 3D optical storage medium 402 is referred to herein as a surface recording layer 442. In other implementations, a grouping of the top-most layers accessible using the plasmonic readers/writers disclosed herein is referred to as one or more surface recording layers. The remaining recording layers within the 3D optical storage medium 402 are referred to herein as interior recording layers (e.g., interior recording layer 478). In 2D formats, the optical storage medium 402 contains a singular recording layer bounded by buffer layers (see e.g., optical storage medium 202 of FIG. 2). The optical storage medium 402 rotates at high speed about a platter spindle (not shown, see e.g., platter spindle 110 of FIG. 1) as information is written to and/or read from data tracks on the optical storage medium 402.

Information may be written to and read from the optical storage medium 402 via an actuator arm (not shown, see e.g., actuator arm 114 of FIG. 1) and its respective slider (not shown, see e.g., slider 116 of FIG. 1). The actuator arm extends toward the optical storage medium 402 and the slider is located at an end of the actuator arm. The slider flies in close proximity above the optical storage medium 402 as the optical storage medium 402 rotates below, as illustrated by arrow 412.

The slider includes the photonic reader, which in turn includes a laser emitter 432 and a fluorescence detector 436. Further, the laser emitter 432 alone may additionally function as a photonic writer. Thus, the photonic reader may be used for reading data from and/or writing data to the interior recording layers of the optical storage medium 402. The slider also includes the plasmonic reader, which in turn includes a plasmon antenna 434 and the fluorescence detector 436. Further, the plasmon antenna 434 alone may additionally function as a plasmonic writer. Thus, the plasmonic reader may be used for reading data from and/or writing data to the surface recording layer 442 of the optical storage medium 402.

When functioning as a photonic writer, the laser emitter 432 directs a laser pulse 480 from a laser source 482 at a write target area 486 on a particular data track and at a particular depth (or interior recording layer) of optical storage medium 402. More specifically, the laser emitter 432 directs the light pulse 480 to a variable emitter optics set 484 that focuses the laser pulse 480 at a desired one of the interior recording layers (here, illustrated as interior recording layer 478).

The focused energy of the laser pulse 480 directed at the interior recording layer 478 causes a photochemical change in the interior recording layer 478 in the target area 486. More specifically, the interior recording layer 478 is treated with a fluorescent dye. The fluorescent dye generally fluoresces when exposed to the focused laser pulse 480, however, if the power applied by the laser pulse 480 is above a threshold, the fluorescent dye is bleached rather than caused to fluoresce. The targeted bleaching on the fluorescent dye is used to write data. A fluorescent signal 470 (discussed in further detail below) read-back from the interior recording layer 478 varies in frequency and/or magnitude in bleached areas of the interior recording layer 478 as compared to nonbleached areas of the interior recording layer 478. As the optical storage medium 402 spins beneath the slider, a series of sequentially written laser pulse target areas forms a written data track on the interior recording layer 478. Radial positioning of the slider may be changed to write data to the interior recording layer 478 on a variety of data tracks of the optical storage medium 402, while the variable emitter optics set 484 may be adjusted to write to a different one of the interior recording layers of the optical storage medium 402.

As noted above, the photonic reader includes both the laser emitter 432 and the fluorescence detector 436 to read data from the optical storage medium 402, particularly the interior recording layers of the optical storage medium 402. In order to read data from the interior recording layer 478, a similar procedure as described above with reference to writing data using the laser emitter 432 is used, except instead of causing a photochemical change in the interior recording layer 478, the laser emitter 432 outputs a power sufficient to cause fluorescence in the target area 486, but insufficient to cause a photochemical change in the interior recording layer 478.

When functioning as a plasmonic writer, the plasmon antenna 434 directs a plasmon pulse 448 at a write target area 450 on a particular data track of the surface recording layer 442. The plasmon antenna 434 receives a light pulse 452 to an emitter optics set 456 that focuses the light pulse 452 on a near-field transducer (NFT) input 464 for NFT 458. The NFT 458 is a self-focusing waveguide including a perimeter plasmonic metal 460 that converts incoming photons from the light pulse 452 into plasmons making up the plasmon pulse 448 and an internal semiconducting layer 462 that serves to guide and focus the photons/plasmons through the NFT 458 to an NFT output 466. Additional details of the NFT 458 may be found in FIGS. 2 and 3 and detailed description thereof.

The plasmon pulse 448 causes a photochemical change in the recording layer 442 in the target area 450 due to fluorescence, as described above. The fluorescent signal 470 (discussed in further detail below) read-back from the surface recording layer 442 similarly varies in frequency and/or magnitude in bleached areas of the surface recording layer 442 as compared to nonbleached areas of the surface recording layer 442. As the optical storage medium 402 spins beneath the slider, a series of sequentially written plasmon pulse target areas forms a written data track on the surface recording layer 442. The radial positioning the slider may be changed to write data to the surface recording layer 442 on a variety of data tracks of the optical storage medium 402.

As noted above, the plasmonic reader includes both the plasmon antenna 434 and the fluorescence detector 436 to read data from the optical storage medium 402, particularly the surface recording layer 442. In order to read data from the surface recording layer 442, a similar procedure as described above with reference to writing data using the plasmon antenna 434 is used, except instead of causing a photochemical change in the recording layer 442, the plasmon antenna 434 outputs a power sufficient to cause fluorescence in the target area 450, but insufficient to cause a photochemical change in the recording layer 442.

The fluorescence detector 436 may be used to receive the fluorescent signal 470, regardless of whether it is generated as a result of the focused laser pulse 480 on the interior recording layer 478 or the plasmon pulse 448 focused on the surface recording layer 442. The laser emitter 432 or plasmon antenna 434 are operated one at a time to reduce or eliminate interference caused by mixed operation of the plasmonic and photonic read/write systems.

The fluorescence detector 436 is positioned in close proximity to the laser emitter 432 and the plasmon antenna 434 to maximize capture of the fluorescent signal 470 and is also oriented at the target areas 450, 486. Further, the fluorescence detector 436 may be placed on either side of the laser emitter 432 and the plasmon antenna 434. Note that while the fluorescence detector 436 is illustrated as pointing behind the target areas 450, 486, as the optical storage medium 402 is in motion (as illustrated by the arrow 412), the fluorescence detector 436 is timed to detect fluorescence (or lack thereof) from the target areas 450, 486 caused by the laser emitter 432 or plasmon antenna 434 as the applicable target area passes behind the laser emitter 432 or plasmon antenna 434. The intensity and/or wavelength of detected fluorescence (or lack thereof) is different depending on whether the target recording layer has been written in the target area (e.g., bleached) or not.

Specifically, the data track to be read-back from a target recording layer emits a variable fluorescent signal 470 as the optical storage medium 402 spins and the laser emitter 432 or plasmon antenna 434 is focused on successive target areas. The fluorescence detector 436 receives this variable fluorescent signal 470 into a collection lens 472 and a collimation lens 474 (collectively, a detector optics set) and routes a resulting collimated beam of light with varying intensity (or detected magnitude) and/or frequency back to a light detector 476, which converts the collimated beam of light into a data read-back signal. In various implementations, the light detector 476 is tuned to an expected frequency of the fluorescent signal 470. Data may also be read back by distinguishing the frequency of the fluorescence from a frequency of reflected photonic or plasmonic energy. This may help to reduce noise.

Appearances of the 3D optical storage medium 402, the laser emitter 432, the plasmon antenna 434, and the fluorescence detector 436 are for illustration purposes only and the features are not drawn to scale.

Figure 5:
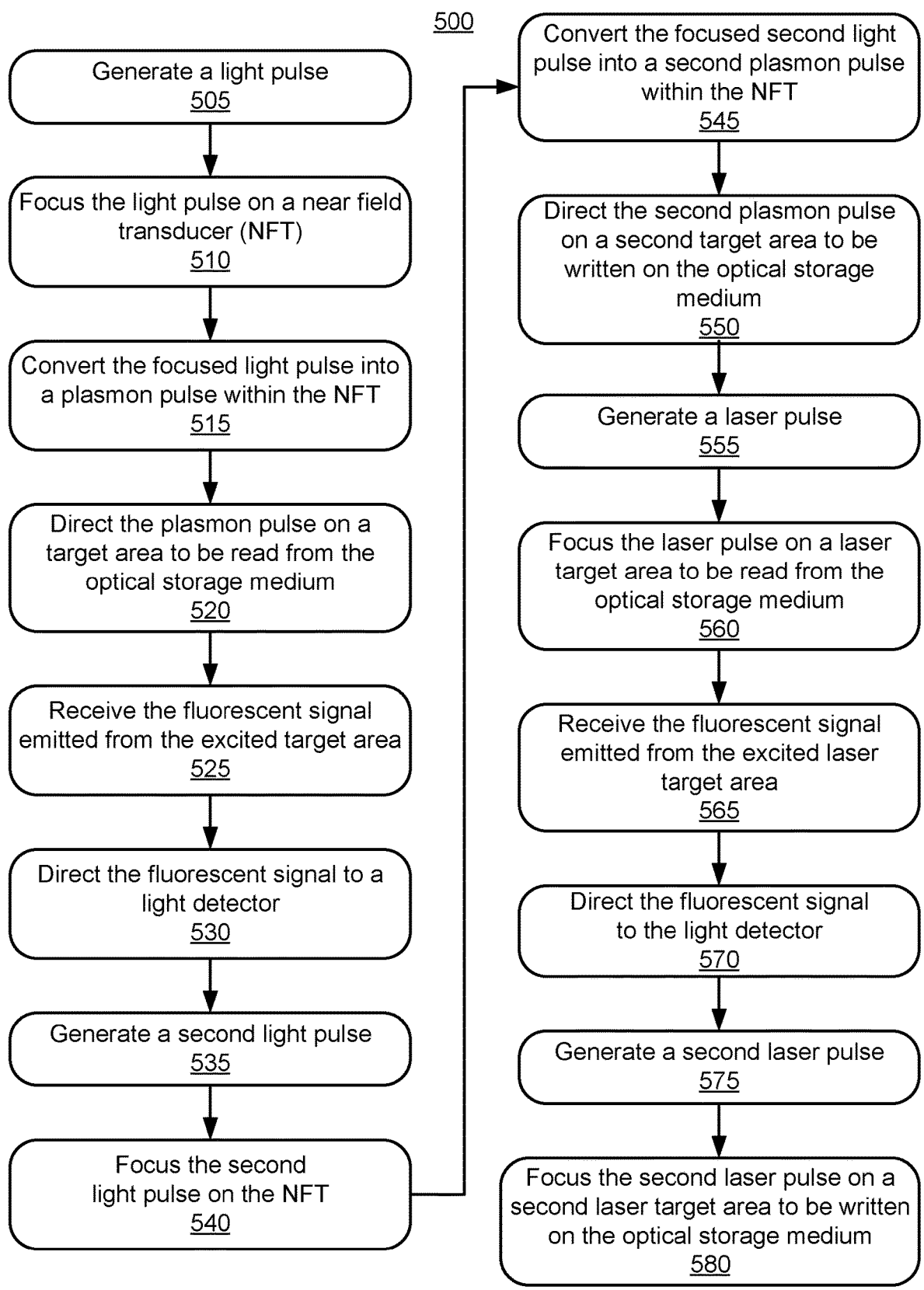
FIG. 5 illustrates example operations for performing read and write operations on a 3D optical storage medium using a photonic reader/writer and a plasmonic reader/writer.

FIG. 5 illustrates example operations 500 for performing read and write operations on a 3D optical storage medium using a photonic reader/writer and a plasmonic reader/writer. Operations 505-530 generally reference reading data from the optical storage medium using the plasmonic reader. A generating operation 505 generates a light pulse, or alternatively a continuous beam of light (e.g., via a light source). A focusing operation 510 focuses the light pulse on a near field transducer (NFT) (e.g., via a set of emitter optics). A converting operation 515 converts the focused light pulse into a plasmon pulse within the NFT. A directing operation 520 directs the plasmon pulse on a target area to be read from the optical storage medium. The plasmon pulse excites the target area to emit a fluorescent signal. Operations 505-520 are generally performed using a plasmon antenna.

A receiving operation 525 receives the fluorescent signal emitted from the excited target area. A directing operation 530 directs the fluorescent signal to a light detector. The light detector converts the fluorescent signal into a signal signifying data read from the optical storage medium using the plasmon antenna. Operations 525-530 are generally performed using a fluorescence detector.

Operations 535-550 generally reference writing data to the optical storage medium using the plasmonic writer. A generating operation 535 generates a second light pulse. A focusing operation 540 focuses the second light pulse on the NFT. A converting operation 545 converts the focused second light pulse into a second plasmon pulse within the NFT. A directing operation 550 directs the second plasmon pulse on a second target area to be written on the optical storage medium. The second plasmon pulse bleaches fluorescent dye at the second target area as a magnitude of the second plasmon pulse exceeds a bleaching threshold for fluorescent dye at the second target area. Operations 535-550 are generally performed using the plasmon antenna.

Operations 555-570 generally reference reading data from the optical storage medium using a photonic reader. A generating operation 555 generates a laser pulse. A focusing operation 560 focuses the laser pulse on a laser target area to be read from the optical storage medium. The laser pulse excites the target area to emit a fluorescent signal. Operations 555-560 are generally performed using a laser emitter.

A receiving operation 565 receives the fluorescent signal emitted from the excited laser target area. A directing operation 570 directs the fluorescent signal to the light detector. The light detector converts the fluorescent signal into a signal signifying data read from the optical storage medium using the laser emitter. Operations 525-530 are generally performed using a fluorescence detector.

Operations 575-580 generally reference writing data to the optical storage medium using the photonic writer. A generating operation 575 generates a second laser pulse. A focusing operation 580 focuses the second laser pulse on a second laser target area to be written on the optical storage medium. The second laser pulse bleaches fluorescent dye at the second laser target area as a magnitude of the second laser pulse exceeds a bleaching threshold for fluorescent dye at the second laser target area. Operations 575-580 are generally performed using the laser emitter.

While operations 500 are presented sequentially and in total, various implementations may only perform a subset of the operations 500, and not necessarily in the order presented. For example, a system performing only read operations using a plasmonic reader may perform only operations 505-530, while another system performing only write operations using a plasmonic writer may perform only operations 535-550, while yet another system performing only read operations using a photonic reader may perform only operations 555-570, and still another system performing only write operations using a photonic writer may perform only operations 575-580, or any combination of the foregoing and in any order.

Figure 6:
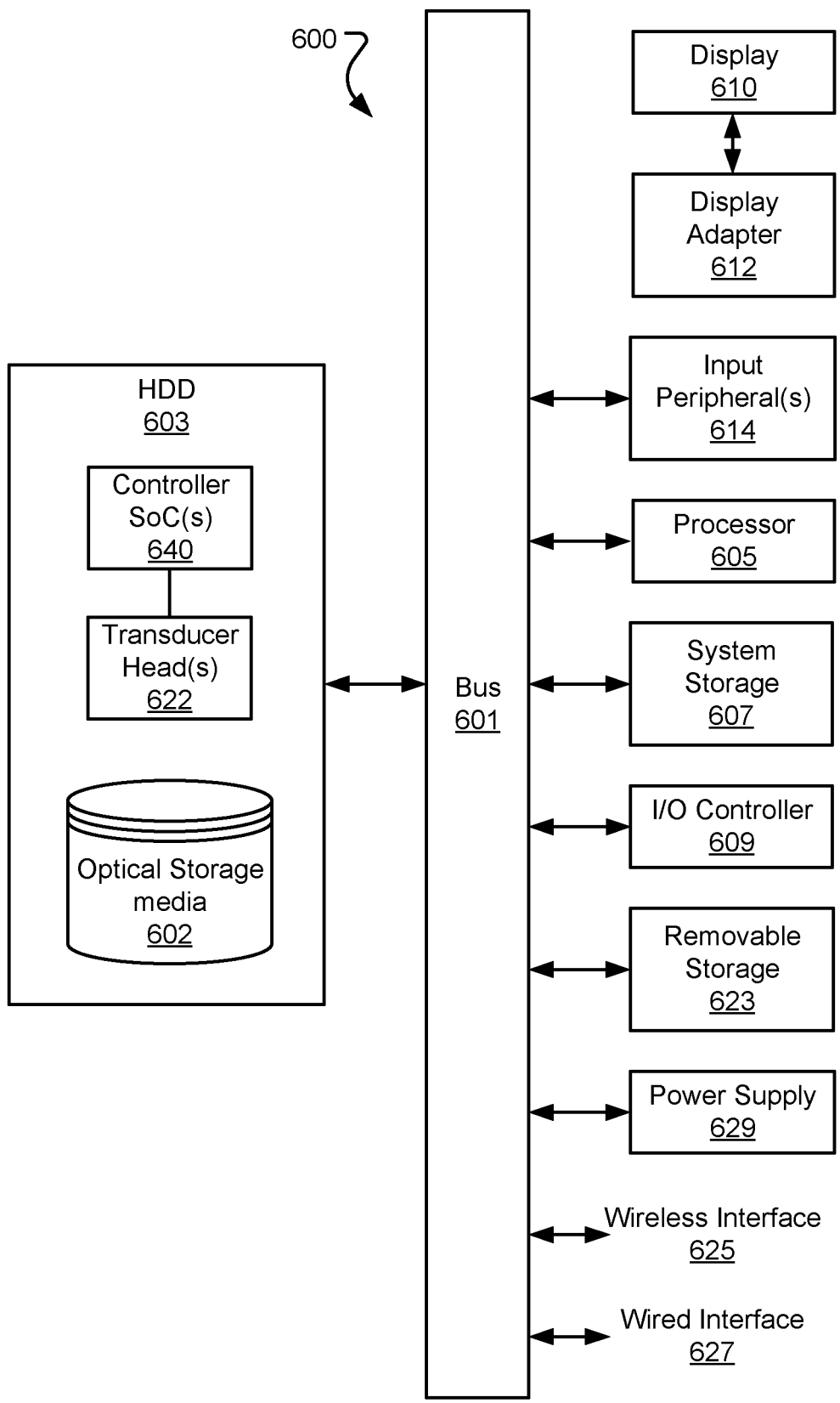
FIG. 6 illustrates an example system diagram of a computer system suitable for executing read and write operations on an optical storage medium using one or both of a photonic reader/writer and a plasmonic reader/writer.

FIG. 6 illustrates an example system diagram of a computer system 600 suitable for executing read and write operations on optical storage media 602 using one or both of photonic reader/writer(s) and plasmonic reader/writer(s) (collectively, one or more transducer heads 622). Optical storage drive 603 includes a series of storage media platters that make up the optical storage media 602, each of which is accessible via a transducer head(s) 622 and associated controller SoC(s) 640. The transducer head(s) 622 include one or both of photonic reader/writer(s) and plasmonic reader/writer(s) as described in detail above.

The computer system 600 manages access to the storage drive 603 and includes a bus 601, which interconnects major subsystems such as a processor 605, system storage 607 (such as random-access memory (RAM) and read-only memory (ROM)), an input/output (I/O) controller 609, removable storage (such as a memory card) 623, a power supply 629, and external devices such as a display screen 610 via a display adapter 612, and various input peripherals 614 (e.g., a mouse, trackpad, keyboard, touchscreen, joystick, and/or smart card acceptance device). Wireless interface 625 together with a wired network interface 627, may be used to interface to the data storage network and/or a local or wide area network (such as the Internet) using any network interface system known to those skilled in the art.

Many other devices or subsystems (not shown) may be connected in a similar manner (e.g., servers, personal computers, tablet computers, smart phones, mobile devices, etc.). Also, it is not necessary for all of the components depicted in FIG. 6 to be present to practice the presently disclosed technology. Furthermore, devices and components thereof may be interconnected in different ways from that shown in FIG. 6. Code (e.g., computer software, including mobile applications (apps)) to implement the presently disclosed technology may be operably disposed in the system storage 607, removable storage 623, and/or the storage drive 603.

The computing system 600 may include a variety of tangible computer-readable storage media (e.g., the system storage 607, the removable storage 623, and the storage drive 603) and intangible computer-readable communication signals. Tangible computer-readable storage can be embodied by any available media that can be accessed by the computing system 600 and includes both volatile and non-volatile storage media, as well as removable and non-removable storage media implemented in any method or technology for storage of information such as computer readable instructions, data structures, program modules, and/or other data. Tangible computer-readable storage media includes, but is not limited to, firmware, RAM, ROM, electrically erasable programmable read-only memory (EEPROM), flash memory or other memory technology, optical disc storage, magnetic cassettes, magnetic tape, magnetic disc storage or other magnetic storage devices, or any other tangible medium which can be used to store the desired information, and which can be accessed by the computing system 600.

Intangible computer-readable communication signals may embody computer readable instructions, data structures, program modules, or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, radio frequency (RF), infrared (IR), and other wireless media. Computer-readable storage media as defined herein specifically excludes intangible computer-readable communications signals.

Some implementations may comprise an article of manufacture which may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (APIs), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

The presently disclosed technology may be implemented as logical steps in one or more computer systems (e.g., as a sequence of processor-implemented steps executing in one or more computer systems and as interconnected machine or circuit modules within one or more computer systems). The implementation is a matter of choice, dependent on the performance requirements of the computer system implementing the presently disclosed technology. Accordingly, the logical operations making up implementations of the presently disclosed technology are referred to variously as operations, steps, objects, or modules. Furthermore, it should be understood that logical operations may be performed in any order, adding or replacing operations as desired, unless explicitly claimed otherwise or a specific order is inherently necessitated by the claim language.

The above specification, examples, and data provide a complete description of the structure and use of exemplary implementations of the presently disclosed technology. Since many implementations of the presently disclosed technology can be made without departing from the spirit and scope of the invention, the presently disclosed technology resides in the claims hereinafter appended. Furthermore, structural features of the different implementations may be combined in yet another implementation without departing from the recited claims.

What is claimed is:

1. A plasmonic transducer head for an optical storage medium comprising:
   a plasmon antenna including:
      a light source to generate a light pulse;
      a plasmon antenna optics set to receive and focus the light pulse; and
      a near field transducer (NFT) to receive the focused light pulse and convert it to a plasmon pulse directed on a target area to be read from the optical storage medium, the plasmon pulse to excite the target area to emit a fluorescent signal, wherein a magnitude of the plasmon pulse is below a bleaching threshold for fluorescent dye at the target area; and
   a fluorescence detector configured to detect fluorescence of the target area caused by the plasmon pulse, the fluorescence detector including:
      a light detector tuned to an expected frequency of the fluorescent signal; and
      a detector optics set to receive the fluorescent signal from the excited target area and direct the fluorescent signal to the light detector.

2. The plasmonic transducer head of claim 1, wherein the plasmon antenna further functions as a plasmonic writer when a magnitude of the plasmon pulse exceeds a bleaching threshold for fluorescent dye at the target area.

3. The plasmonic transducer head of claim 1, further comprising:
   a laser emitter including:
      a laser source to generate a laser pulse; and
      a laser emitter optics set to receive and focus the laser pulse on a laser target area to be read from the optical storage medium, the laser pulse to excite the laser target area to emit a fluorescent signal, wherein the fluorescence detector is additionally configured to detect fluorescence of the laser target area caused by the laser pulse.

4. The plasmonic transducer head of claim 3, wherein a magnitude of the laser pulse is below a bleaching threshold for fluorescent dye at the laser target area.

5. The plasmonic transducer head of claim 3, wherein the laser emitter further functions as a photonic writer when a magnitude of the laser pulse exceeds a bleaching threshold for fluorescent dye at the laser target area.

6. The plasmonic transducer head of claim 3, wherein the target area is on one or more surface layers of the optical storage medium and the laser target area is on an interior layer of the optical storage medium.

7. The plasmonic transducer head of claim 1, wherein a variation in detected frequency from the expected frequency of the fluorescent signal is used to read data from the optical storage medium.

8. The plasmonic transducer head of claim 1, wherein a variation in detected magnitude of the fluorescent signal is used to read data from the optical storage medium.

9. The plasmonic transducer head of claim 1, wherein the target area is less than 30 nm$^2$.

10. A method of reading first data from an optical storage medium using a plasmonic transducer head, the method comprising:
   generating a light pulse;
   focusing the light pulse on a near field transducer (NFT);
   converting the focused light pulse into a plasmon pulse within the NFT;
   directing the plasmon pulse on a target area to be read from the optical storage medium, the plasmon pulse to excite the target area to emit a fluorescent signal, wherein a magnitude of the plasmon pulse is below a bleaching threshold for fluorescent dye at the target area;
   receiving the fluorescent signal emitted from the excited target area; and
   directing the fluorescent signal to a light detector to read the first data from the excited target area of the optical storage medium.

11. The method of claim 10, further comprising:
   generating a second light pulse;
   focusing the second light pulse on the NFT;
   converting the focused second light pulse into a second plasmon pulse within the NFT; and
   directing the second plasmon pulse on a second target area to be written on the optical storage medium, the second plasmon pulse to bleach fluorescent dye at the second target area to write second data to the second target area of the optical storage medium, wherein a magnitude of the second plasmon pulse exceeds a bleaching threshold for fluorescent dye at the second target area.

12. The method of claim 10, further comprising:
generating a laser pulse;
focusing the laser pulse on a laser target area to be read from the optical storage medium, the laser pulse to excite the laser target area to emit a fluorescent signal;
receiving the fluorescent signal emitted from the excited laser target area; and
directing the fluorescent signal to the light detector.

13. The method of claim 12, further comprising:
generating a second laser pulse; and
focusing the second laser pulse on a second laser target area to be written on the optical storage medium, the second laser pulse to bleach fluorescent dye at the second laser target area, wherein a magnitude of the second laser pulse exceeds a bleaching threshold for fluorescent dye at the second laser target area.

14. An optical storage drive comprising:
a multi-layered optical storage medium;
a plasmon antenna including:
   a light source to generate a light pulse;
   an emitter optics set to receive and focus the light pulse; and
   a near field transducer (NFT) to receive the focused light pulse and convert it to a plasmon pulse directed on a surface target area to be read from one or more surface layers of the multi-layered optical storage medium, the plasmon pulse to excite the surface target area to emit a fluorescent signal;
a laser emitter including:
   a laser source to generate a laser pulse;
   a laser emitter optics set to receive and focus the laser pulse on an interior target area to be read from an interior layer of the multi-layered optical storage medium, the laser pulse to excite the interior target area to emit a fluorescent signal;
a fluorescence detector configured to detect fluorescence of an excited target area caused by one of the plasmon pulse and the laser pulse, the fluorescence detector including:
   a light detector tuned to an expected frequency of the fluorescent signal; and
   a detector optics set to receive the fluorescent signal from the excited target area and direct the fluorescent signal to the light detector.

15. The optical storage drive of claim 14, wherein the fluorescence detector is to selectively detect fluorescence of the excited target area on one or more surface layers of the optical storage medium and fluorescence the excited target area on an interior layer of the optical storage medium.

16. The optical storage drive of claim 14, wherein a magnitude of the plasmon pulse is below a bleaching threshold for fluorescent dye at the target area.

17. The optical storage drive of claim 14, wherein the plasmon antenna further functions as a plasmonic writer when a magnitude of the plasmon pulse exceeds a bleaching threshold for fluorescent dye at the target area.

18. The optical storage drive of claim 14, wherein a magnitude of the laser pulse is below a bleaching threshold for fluorescent dye at the target area.

19. The optical storage drive of claim 14, wherein the laser emitter further functions as a photonic writer when a magnitude of the laser pulse exceeds a bleaching threshold for fluorescent dye at the target area.

* * * * *